United States Patent
Nakamura et al.

(10) Patent No.: US 8,384,930 B2
(45) Date of Patent: Feb. 26, 2013

(54) DOCUMENT MANAGEMENT SYSTEM FOR VOUCHERS AND THE LIKE

(75) Inventors: Osamu Nakamura, Kawasaki (JP); Hiroyuki Kaneko, Kawasaki (JP); Hiroshi Sekine, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1281 days.

(21) Appl. No.: 11/863,332

(22) Filed: Sep. 28, 2007

(65) Prior Publication Data

US 2008/0231909 A1 Sep. 25, 2008

(30) Foreign Application Priority Data

Mar. 23, 2007 (JP) .................................. 2007-077297

(51) Int. Cl.
*G06F 3/12* (2006.01)
(52) U.S. Cl. .... 358/1.15; 358/403; 358/474; 707/999.1; 709/203; 709/217
(58) Field of Classification Search ................. 358/1.15, 358/474, 400; 382/100; 715/764, 234; 700/91, 700/214; 705/1.1, 45; 709/203, 206, 217, 709/219
See application file for complete search history.

(56) References Cited

U.S. PATENT DOCUMENTS

| | | | |
|---|---|---|---|
| 5,887,154 A | 3/1999 | Iwasa et al. | |
| 5,999,724 A | 12/1999 | Iwasa et al. | |
| 6,311,166 B1 | 10/2001 | Nado et al. | |
| 6,421,691 B1 | 7/2002 | Kajitani | |
| 2002/0152156 A1 | 10/2002 | Tyson-Quah | |
| 2002/0156644 A1 | 10/2002 | Davies et al. | |
| 2002/0194059 A1 | 12/2002 | Blocher et al. | |
| 2003/0208421 A1* | 11/2003 | Vicknair et al. | ................. 705/35 |
| 2004/0084277 A1* | 5/2004 | Blair | .............................. 194/206 |
| 2004/0107115 A1 | 6/2004 | Takano et al. | |
| 2004/0236651 A1 | 11/2004 | Emde et al. | |

(Continued)

FOREIGN PATENT DOCUMENTS

| | | |
|---|---|---|
| CN | 1518699 A | 8/2004 |
| JP | 5165844 A | 7/1993 |

(Continued)

OTHER PUBLICATIONS

Chinese Office Action issued Jun. 28, 2010, in counterpart Chinese Application No. 200710181940.5.

(Continued)

*Primary Examiner* — King Poon
*Assistant Examiner* — David S Cammack
(74) *Attorney, Agent, or Firm* — Sughrue Mion, PLLC

(57) ABSTRACT

An information processing system includes: an information processing apparatus; and an image input apparatus. The information processing apparatus performs: storing a correspondence relationship between a document and a user in charge of the image input of the document; transmitting a request for the image input to the user; picking out information on the document from the correspondence relationship on the basis of information on the user; and transmitting the information on the document to the image input apparatus. The image input apparatus performs: authenticating the user; transmitting a name specifying the authenticated user to the information processing system; receiving information on a document associated with the user from the information processing system; requesting the image input based on the received information on the document; inputting an image; registering the input image; and transmitting to the information processing system information on the registered image and the document.

4 Claims, 12 Drawing Sheets

U.S. PATENT DOCUMENTS

| | | |
|---|---|---|
| 2004/0260634 A1 | 12/2004 | King et al. |
| 2005/0055451 A1 | 3/2005 | Tsuyama et al. |
| 2005/0137883 A1 | 6/2005 | Nohgawa et al. |
| 2005/0258246 A1* | 11/2005 | Wolff et al. .................. 235/454 |
| 2006/0004688 A1* | 1/2006 | Scanlon et al. .................. 707/1 |
| 2006/0039045 A1* | 2/2006 | Sato et al. .................... 358/538 |
| 2006/0052156 A1 | 3/2006 | Yates et al. |
| 2006/0059026 A1 | 3/2006 | King et al. |
| 2006/0074699 A1* | 4/2006 | Samsky et al. .................. 705/1 |
| 2006/0085442 A1* | 4/2006 | Fujiwara ...................... 707/100 |
| 2006/0212486 A1 | 9/2006 | Kennis et al. |
| 2006/0268352 A1 | 11/2006 | Tanigawa et al. |
| 2006/0277080 A1 | 12/2006 | DeMartine et al. |
| 2007/0108270 A1 | 5/2007 | Bjoraker et al. |
| 2007/0179870 A1 | 8/2007 | Goodbody et al. |
| 2009/0018885 A1 | 1/2009 | Parales |

FOREIGN PATENT DOCUMENTS

| | | |
|---|---|---|
| JP | 8190587 A | 7/1996 |
| JP | 2002073938 A | 3/2002 |
| JP | 2002279146 A | 9/2002 |
| JP | 2002304592 A | 10/2002 |
| JP | 2003196435 A | 7/2003 |
| JP | 2003256633 A | 9/2003 |
| JP | 2004-234692 A | 8/2004 |
| JP | 2006-040069 A | 2/2006 |
| JP | 2006110978 A | 4/2006 |
| JP | 2006211399 A | 8/2006 |
| JP | 2006330863 A | 12/2006 |
| JP | 200726207 A | 2/2007 |

OTHER PUBLICATIONS

U.S. Appl. No. 11/867,045, filed Oct. 4, 2007.
U.S. Appl. No. 11/959,516, filed Dec. 19, 2007.
U.S. Appl. No. 12/016,237, filed Jan. 18, 2008.
Japanese Office Action corresponding to Japanese Patent Application No. 2007-077297 dated Nov. 29, 2011.
Jun Nagaoka, Document Management, Computer World, Get Technology Right, vol. 2, No. 6, Japan, Jun. 1, 2005, pp. 104-111.

* cited by examiner

FIG. 7

```
┌─────────────────────────────────────────────────┐ 700
│ ▣ LOGIN                          ┌──────────┐   │
│                                  │EXECUTION │   │
│                                  │ OF LOGIN │   │
│ ─────────────────────────────────└──────────┘── │
│                                                 │
│      USER NAME:                                 │
│ 701 ┌─────────────────────────┐  ┌──────────┐   │
│     └─────────────────────────┘  │  USER    │   │
│                                  │SELECTION │   │
│      PASSWORD:                   └──────────┘   │
│ 702 ┌─────────────────────────┐                 │
│     └─────────────────────────┘                 │
│                                                 │
└─────────────────────────────────────────────────┘
```

FIG. 8

```
┌─────────────────────────────────────────────────┐ 800
│ ▤ MENU                           ┌──────────┐   │
│                                  │  CANCEL  │   │
│ ─────────────────────────────────└──────────┘── │
│                                                 │
│ 801 ─ ☐ VOUCHER REGISTRATION                    │
│                                                 │
│                                                 │
│                                                 │
└─────────────────────────────────────────────────┘
```

DOCUMENT MANAGEMENT SYSTEM FOR VOUCHERS AND THE LIKE

CROSS-REFERENCE TO RELATED APPLICATION

This application is based on and claims priority under 35 USC §119 from Japanese Patent Application No. 2007-77297 filed Mar. 23, 2007.

BACKGROUND (i) Technical Field

The present invention relates to an information processing system, an image input display system, an image input system, an information processing method, an image input display method, and an image input method.

(ii) Related Art

In recent years, a financial internal control is requested. In the financial internal control, the 'internal control-integrated framework' announced by COSO (committee of sponsoring organizations of the treadway commission) in 1992 is a de facto standard. The financial internal control is defined as 'one process executed by the board of directors, corporate managers, other employees, which aims to provide reasonable guarantee in order to achieve three objects of (1) effectiveness and efficiency of a work, (2) reliability of financial statements, and (3) compliance of relevant laws and regulations'.

Assessment of a work process is performed as the internal control. At this time, it is requested to check a voucher used in the assessment of control.

In assessment (maintenance assessment and operation assessment) of a work process of the internal control, there have been the following three issues in management of vouchers used in the assessment of control. First, it has been difficult to efficiently collect a voucher related to assessment. Second, it has been difficult to manage a collection situation of the vouchers. Third, it has been difficult to efficiently specify and refer to collected vouchers in execution of the assessment.

SUMMARY

According to an aspect of the invention, there is provided an information processing system comprising: an information processing apparatus; and an image input apparatus, the information processing apparatus comprising:

a memory that stores a correspondence relationship between a name specifying a document for which image input is to be performed and a name specifying a user who is a person in charge of the image input of the document;

a first transmission unit that transmits a request for the image input of the document to the user; and a second transmission unit that picks out information on the name specifying the document, for which image input is to be performed, from the correspondence relationship stored in the memory on the basis of information on the name specifying the user, the information on the name specifying the user being transmitted from the image input apparatus, and that transmits the information on the name specifying the document to the image input apparatus, the image input apparatus comprising:

an authentication unit that authenticates the user;

a third transmission unit that transmits a name specifying the authenticated user to the information processing apparatus;

a receiving unit that receives information on a name specifying a document associated with the name specifying the user from the information processing apparatus;

a display that shows a display urging image input of the document based on the received information on the name specifying the document;

an image input unit that inputs an image;

a registration unit that registers the input image; and a fourth transmission unit that transmits to the information processing system information on a name specifying the registered image and the name specifying the document.

BRIEF DESCRIPTION OF THE DRAWINGS

Embodiments of the present invention will be described in detail based on the following figures, wherein:

FIG. 7 is an explanatory view illustrating an example of a display of a login screen in a multifunction machine;

FIG. 8 is an explanatory view illustrating an example of a display of a menu screen in the multifunction machine;

Figure 1:
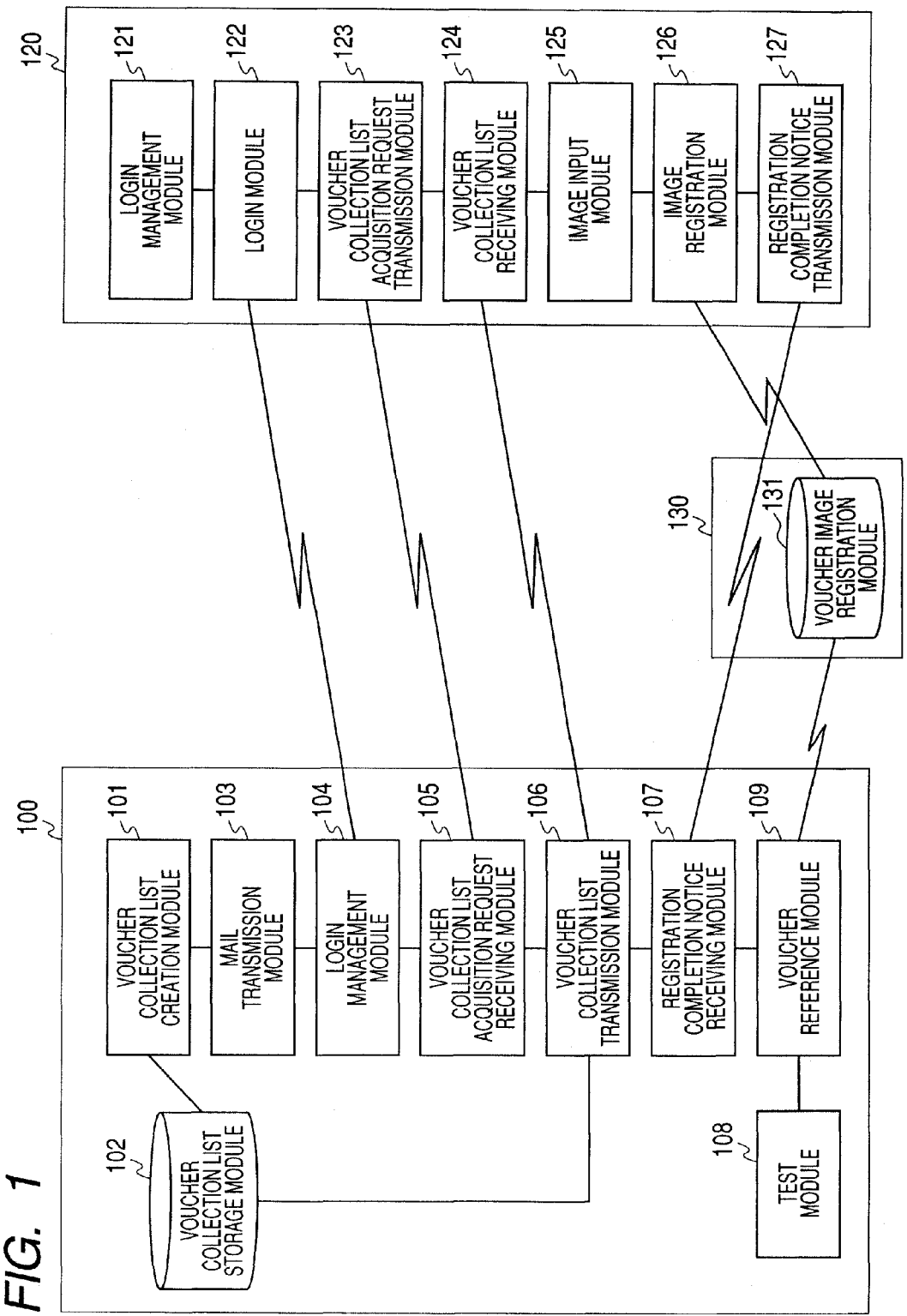
FIG. 1 is a view illustrating the conceptual module configuration in an exemplary embodiment of the invention.

100: internal control system
101: voucher collection list creation module
102: voucher collection list storage module
103: mail transmission module
104: login management module
105: voucher collection list acquisition request receiving module
106: voucher collection list transmission module
107: registration completion notice receiving module
108: test module 109: voucher reference module
120: image input system
121: login management module
122: login module
123: voucher collection list acquisition request transmission module
124: voucher collection list receiving module
125: image input module
126: image registration module
127: registration completion notice transmission module
130: image registration system
131: voucher image registration module
201: planner
202: person in charge of voucher collection
211: internal control management server
212: multifunction machine
213: DMS server
221: PC
222: network

DETAILED DESCRIPTION

First, 'basic controlled document', 'risk', 'control', and the like of an internal control will be described.

The basic controlled document refers to a basic document created for every work process to be subjected to the financial internal control. Specifically, the basic controlled document includes work description, a work flow, an RCM (risk control matrix), and a job division table.

The work description is also called a narrative. In the work description, a series of work flow from the start of trading to final writing to general ledger and a report are documented. A regulation document, such as personnel regulations and accounting regulations is a higher level document of the work description, and revision of the regulation document affects the work description. In addition, a work manual is a lower level document of the work description and is affected by the revision of the work description.

A work flow chart visually expresses a series of work flow from the start of trading to final writing to general ledger and a report using a flow chart. The risk and control are also arranged in this flow.

In association with internal control activities relevant to a work process, main points (assertion) on the control which should be attained, a risk that is considered, and corresponding internal control activities are summarized as a list in the RCM (risk control matrix).

The job division table is used to check a problem related to a financial control, for example, whether or not duplication of processing by the same person in charge occurs in the flow of a work process.

In addition, the assertion serves as a prerequisite for asserting that financial information is reliable information. Specifically, six items including reality, comprehensibility, assessment, right and duty, period/allocation, and display are generally used. However, since the items can be partially changed according to companies or audit corporations, it is desirable that the items can be customized.

The risk refers to an obstacle against the assertion that is considered on the work process. For example, as a risk in a receipt processing work, 'approval is made even if a receipt is not attached' is considered.

The control refers to internal control activities against the risk. As types of control, there are prevention type control, discovery type control, and the like. For example, as a control against the above risk of the receipt processing work, a 'person in charge of receipt processing and reception of the accounts and finance department is sure to collate details of accounts with actual receipts attached' is considered.

Hereinafter, an embodiment that is suitable for realizing the invention will be described with reference to the accompanying drawings.

FIG. 1 is a view illustrating the conceptual module configuration in an embodiment of the invention.

In addition, modules generally refer to logically separable components, such as software and hardware. Therefore, a module in the present embodiment indicates not only a module in a program but also a module in the hardware configuration. Thus, in the present embodiment, a method is also described in addition to a program and a system. In addition, 'store', 'be stored', and words equivalent thereto are used for the convenience of explanation, and these words means that a control is made to be stored in a storage device in the case when an embodiment corresponds to a program. Moreover, a module corresponds to a function in almost one-to-one manner. However, at the time of mounting, one module may be realized using one program or a plurality of modules may be realized using one program. Alternatively, one module may be realized using a plurality of programs. In addition, a plurality of modules may be executed by one computer, or one module may be executed by a plurality of computers in a distribution or parallel environment. In addition, other modules may be included in one module. In addition, 'connection' referred hereinafter includes logical connection (transmission and reception of data, instruction, and so on) as well as physical connection.

Moreover, a system or an apparatus may be realized by connecting a plurality of computers, hardware, and apparatuses to one another using a communication unit such as a network or may be realized using one computer, hardware, and an apparatus.

In addition, a database is used to store data. Therefore, the structure of storage or the structure of search may not be provided, or it may be possible to include a function beyond that described above.

In the present embodiment, an internal control system 100, an image input system 120, and an image registration system 130 are provided as shown in FIG. 1.

The internal control system 100 includes a voucher collection list creation module 101, a voucher collection list storage module 102, a mail transmission module 103, a login management module 104, a voucher collection list acquisition request receiving module 105, a voucher collection list transmission module 106, a registration completion notice receiving module 107, a test module 108, and a voucher reference module 109. The internal control system 100 is operated by a user who is a planner of assessment of a work process associated with an internal control.

The voucher collection list creation module 101 is connected with the voucher collection list storage module 102 and the mail transmission module 103. The voucher collection list creation module 101 creates a list of vouchers (documents for which image input is to be performed; specifically, an expense sheet and the like), which is to be collected, on the basis of the user's operation. The list includes at least a name specifying a document for which image input is to be performed and a name specifying a person in charge of image input of the document in a condition in which the name specifying the document corresponds to the name specifying the person in charge. In addition, when creation of the list is completed, the list is stored in the voucher collection list storage module 102 and then the control is passed over to the mail transmission module 103. In addition, as the 'name specifying a document', there is a document name or an identifier by which a corresponding document can be uniquely identified, for example.

The voucher collection list storage module 102 is connected with the voucher collection list creation module 101 and voucher collection list transmission module 106. The list created by the voucher collection list creation module 101 is stored. Moreover, a state of a document may be stored. In addition, contents stored may be accessed from the voucher collection list transmission module 106.

The mail transmission module 103 is connected with the voucher collection list creation module 101 and the login management module 104. After creation of the list is completed by the voucher collection list creation module 101, a mail that requests image input of the document is transmitted to a person in charge. After transmitting the request mail, a state indicating that image input of the corresponding document transmitted to the person in charge has been completed may be stored in the voucher collection list storage module 102. Then, the control is passed over to the login management module 104.

The login management module 104 is connected with the mail transmission module 103 and the voucher collection list acquisition request receiving module 105 and is also connected with a login module 122 of the image input system 120 through a communication line. The login management module 104 receives login processing from the login module 122 and performs the login processing. The login processing is login processing related to the person in charge to whom the request mail was transmitted by the mail transmission module 103. Then, the control is passed over to the voucher collection list acquisition request receiving module 105.

The voucher collection list acquisition request receiving module 105 is connected with the login management module 104 and the voucher collection list transmission module 106 and is also connected with a voucher collection list acquisition request transmission module 123 of the image input system 120 through a communication line. The voucher collection list acquisition request receiving module 105 receives a transmission request of the voucher collection list, which is transmitted from the voucher collection list acquisition request transmission module 123. Then, the control is passed over to the voucher collection list transmission module 106.

The voucher collection list transmission module 106 is connected with the voucher collection list storage module 102, the voucher collection list acquisition request receiving module 105, and registration completion notice receiving module 107. Furthermore, the voucher collection list transmission module 106 is also connected with a voucher collection list receiving module 124 of the image input system 120 through a communication line. The voucher collection list transmission module 106 takes out information on a name specifying the document, for which image input is to be performed, from correspondence relation stored in the voucher collection list storage module 102 on the basis of information on a name specifying the person in charge who logs in by the login management module 104 and then transmits the information on the name specifying the document to the voucher collection list receiving module 124 of the image input system 120. In addition, the 'information on a name specifying a document' includes a name specifying a document, what is converted into a document name that enables a user to specify the document on the basis of an identifier of the document, and the like. Then, the control is passed over to the registration completion notice receiving module 107.

The registration completion notice receiving module 107 is connected with the voucher collection list transmission module 106 and the voucher reference module 109 and is also connected with a registration completion notice transmission module 127 of the image input system 120 through a communication line. After transmitting the information on the name specifying the document by means of the voucher collection list transmission module 106, the registration completion notice receiving module 107 receives information on a name specifying a registered image and a name specifying a document from a registration completion notice transmission module 127. In addition, after receiving the name specifying the registered image, a state indicating that image registration of the document has been completed may be stored in the voucher collection list storage module 102. Then, it is notified to the voucher reference module 109 that registration has been completed.

The test module 108 is connected with the voucher reference module 109. Assessment of the work process is performed using the voucher reference module 109.

The voucher reference module 109 is connected with the registration completion notice receiving module 107 and the test module 108 and is also connected with a voucher image registration module 131 of the image registration system 130 through a communication line. The voucher reference module 109 receives that the registration has been completed from the registration completion notice receiving module 107 and accesses the voucher image registration module 131 in response to the request from the test module 108.

The image input system 120 includes a login management module 121, the login module 122, the voucher collection list acquisition request transmission module 123, the voucher collection list receiving module 124, an image input module 125, an image registration module 126, and a registration completion notice transmission module 127. The image input system 120 is used to perform image input of a document that is a voucher and is operated by a user who is a person in charge of voucher collection. The login management module 121 is connected with the login module 122.

The login management module 121 serves to perform login processing for logging in the image input system 120 and the internal control system 100. Specifically, a login screen is disposed on the image input system 120, for example. If there is an input from a user, the control is passed over to the login module 122.

The login module 122 is connected with the login management module 121 and the voucher collection list acquisition request transmission module 123 and is also connected with the login management module 104 of the internal control system 100 through a communication line. The user is authenticated through communication with the login management module 104 of the internal control system 100. Then, if the user is correctly authenticated, the control is passed over to the voucher collection list acquisition request transmission module 123.

The voucher collection list acquisition request transmission module 123 is connected with the login module 122 and the voucher collection list receiving module 124 and is also connected with the voucher collection list acquisition request receiving module 105 of the internal control system 100 through a communication line. The voucher collection list acquisition request transmission module 123 transmits to the voucher collection list acquisition request receiving module 105 of the internal control system 100 a name specifying the user authenticated by the login module 122 and a transmission request of a voucher collection list corresponding to the user and then passes over the control to the voucher collection list receiving module 124.

The voucher collection list receiving module 124 is connected with the voucher collection list acquisition request transmission module 123 and the image input module 125 and is also connected with the voucher collection list transmission module 106 of the internal control system 100 through a communication line. The voucher collection list receiving module 124 receives, from the voucher collection list transmission module 106, information on a name specifying a document related with the name specifying the user corresponding to the transmission request of the voucher collection list transmitted by the voucher collection list acquisition request transmission module 123 and then passes over the control to the image input module 125.

The image input module 125 is connected with the voucher collection list receiving module 124 and the image registration module 126. Using the information on the name specifying the document received by the voucher collection list receiving module 124, the image input module 125 performs a display that requests image input of the document in the image input system 120. Then, an image is input by an operation of the user, and then the control is passed over to the image registration module 126.

The image registration module 126 is connected with the image input module 125 and the registration completion notice transmission module 127 and is also connected with the voucher image registration module 131 of the image registration system 130 through a communication line. The image registration module 126 registers the image input by the image input module 125 in the voucher image registration module 131 and passes over the control to the registration completion notice transmission module 127.

The registration completion notice transmission module 127 is connected with the image registration module 126 and is also connected with the registration completion notice receiving module 107 of the internal control system 100 through a communication line. The registration completion notice transmission module 127 transmits to the registration completion notice receiving module 107 the information on the name specifying the document and the name specifying the image registered by the image registration module 126.

The image registration system 130 includes the voucher image registration module 131.

The voucher image registration module 131 is connected with the voucher reference module 109 of the internal control system 100 and the image registration module 126 of the image input system 120 through a communication line. The voucher image registration module 131 registers the image received from the image registration module 126 and the registered image is accessed from the voucher reference module 109.

Next, examples of configuration and processing of a system for realizing the present embodiment will be described in detail with reference to FIGS. 2 and 15.

The internal control system 100 corresponds to an internal control management server 211, the image input system 120 corresponds to a multifunction machine 212, and the image registration system 130 corresponds to a DMS server 213. A planner 201 operates the internal control management server 211 and a person in charge of voucher collection 202 operates the multifunction machine 212. In addition, the multifunction machine is also called a multi-functional copy machine and has functions, such as a scanner, a printer, a copy machine, a facsimile, and the like.

Figure 15:
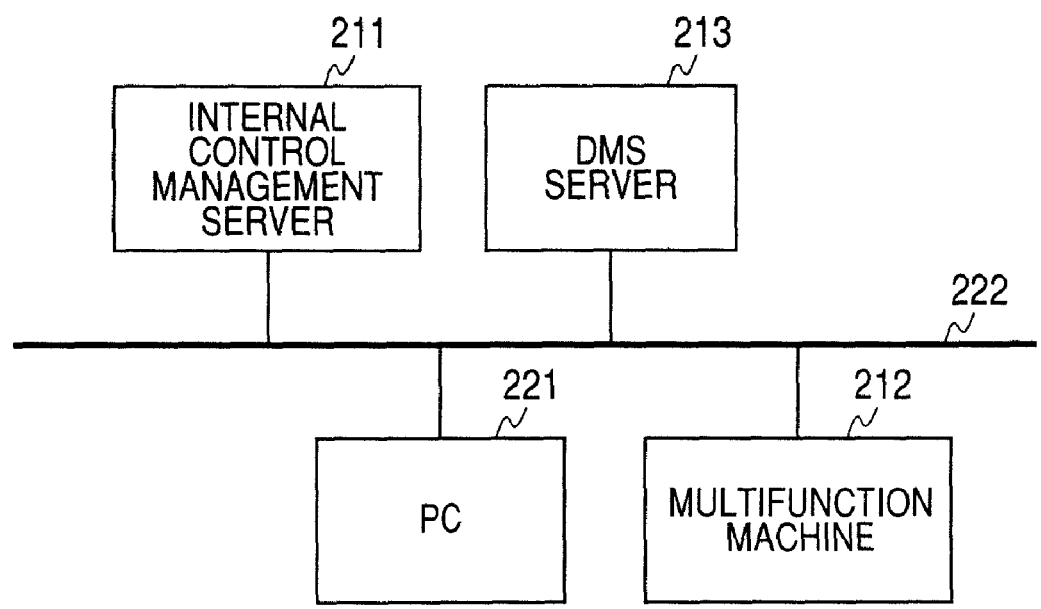
FIG. 15 is a block diagram illustrating an exemplary configuration of a system for realizing the present embodiment, wherein reference numerals and signs are set forth below.

As shown in FIG. 15, the internal control management server 211, the DMS server 213, a PC 221, and the multifunction machine 212 are connected to one another through a network 222 which is a communication line. A plurality of internal control management servers 211, DMS servers 213, PCs 221, and the multifunction machines 212 may be provided, and the PC 221 may be connected as many as the number of persons in charge. The PC 221 is used to receive a mail of the person in charge of voucher collection 202 or operate the internal control management server 211 by means of the planner 201, for example.

(1) Test Planning

The planner 201 makes a test plan of maintenance assessment or operation assessment using the internal control management server 211. For example, it is determined which kinds of vouchers are required in association with control of a work process.

(2) Voucher Collection Request

After making the test plan, the planner 201 transmits a mail, which requests collection of vouchers (requests to register vouchers in the DMS server 213 as an image), to the person in charge of voucher collection 202 through the internal control management server 211.

(3) Collection Request Mail

The collection request mail that the planner 201 has transmitted using the internal control management server 211 is transmitted to a personal computer or the like that the person in charge of voucher collection 202 uses.

(4) Login

The person in charge of voucher collection 202 who has received the collection request mail collects vouchers, which are requested paper documents, and prepares image input of the vouchers using the multifunction machine 212. After completing the collection of the vouchers for which image input is to performed, the person in charge of voucher collection 202 logs in using the multifunction machine 212.

(5) Voucher List

Communication between the multifunction machine 212 and the internal control management server 211 is performed, such that a list of names of vouchers to be collected, corresponding to the person in charge of voucher collection 202 who logs in the multifunction machine 212, is transmitted from the internal control management server 211 to the multifunction machine 212.

(6) Display of Voucher List

The multifunction machine 212 displays the received voucher list and requests image input of the vouchers.

(7) Selection of an Object to be Registered

The person in charge of voucher collection 202 selects the collected vouchers from the voucher list displayed on the multifunction machine 212. That is, it is designated to which voucher of the voucher list a voucher to be scanned from now corresponds.

(8) Scan

The person in charge of voucher collection 202 sets the voucher in the multifunction machine 212 so that the voucher can be scanned.

(9) Registration of Content and Attribute

After the scan is completed, the multifunction machine 212 registers an image (content) that is scanned and at this time of the image in the DMS server 213.

(10) Notification of Registration Completion

After the registration of vouchers is completed, the multifunction machine 212 notifies the internal control management server 211 of registration completion. In this case, the multifunction machine 212 transmits to the internal control management server 211, for example, a document identifier by which an image of the registered voucher can be uniquely identified is transmitted to the internal control management server 211. The internal control management server 211 can manage how the collection of vouchers is going.

Next, an example of processing in the present embodiment will be described with reference to FIG. 3.

A maintenance assessment phase 301 includes a plan phase and an execution phase. The plan phase of the maintenance assessment phase 301 is from step S311 to step S324. The execution phase of the maintenance assessment phase 301 is from step S351 to step S353.

Further, a voucher request state 302 includes a non-request state, a request completion state, and a registration completion state. The non-request state as the voucher request state 302 is from step S311 to the middle of step S314. The request completion state as the voucher request state 302 is from the middle of step S314 to step S324. The registration completion state as the voucher request state 302 is from the middle of step S324 to step S353.

First, the planner 201 makes a test plan of the maintenance assessment using the internal control management server 211 (step S311).

Then, the planner 201 executes a voucher collection request using the internal control management server 211 (step S312).

The internal control management server 211 receives the voucher collection request and transmits a mail of the collection request to the person in charge of voucher collection 202 (step S313). As contents of the mail, there is a name of a voucher to be collected. The person in charge of voucher collection 202 receives the mail through the PC.

The internal control management server 211 receives that the mail has been transmitted or the mail has arrived and then changes the voucher request state 302 from the non-request state to the request completion state (step S314). That is, the internal control management server 211 changes the voucher request state 302 from the non-request state to the request completion state for every voucher in the voucher collection list storage module 102.

The person in charge of voucher collection 202 who has received the mail and has collected vouchers logs in the multifunction machine 212 (step S315).

The multifunction machine 212 performs login of the person in charge of voucher collection 202 with respect to the internal control management server 211 (step S316).

When the login processing is normally completed, the multifunction machine 212 performs a voucher list acquisition request with respect to the internal control management server 211 (step S317).

In response to the request, the internal control management server 211 transmits a voucher list to the multifunction machine 212 (step S318).

The multifunction machine 212 displays a voucher selection screen using the received voucher list (step S319).

The person in charge of voucher collection 202 views the display and operates the multifunction machine 212 to select a voucher to be scanned (step S320).

Then, the person in charge of voucher collection 202 operates the multifunction machine 212 to start scanning (step S321). The multifunction machine 212 inputs an image.

The multifunction machine 212 registers scanned image data in the DMS server 213 (step S322).

The multifunction machine 212 notifies the internal control management server 211 that the registration of the vouchers into the DMS server 213 has been completed. In this case, for example, a voucher name and a document identifier, by which the image can be uniquely identified, are transmitted together (step S323).

When the internal control management server 211 receives the registration completion notice, the internal control management server 211 changes the voucher request state 302 from the request completion state to the registration completion state (step S324). That is, the internal control management server 211 changes the voucher request state 302 from the request completion state to the registration completion state for every voucher in the voucher collection list storage module 102.

In the execution phase of the maintenance assessment phase 301, the planner 201 instructs execution of the maintenance assessment using the internal control management server 211 (step S351). There is reference of a voucher as a part of the assessment.

The internal control management server 211 requests a voucher content (image data of a voucher) to the DMS server 213 (step S352).

The DMS server 213 transmits the voucher content to the internal control management server 211, and the internal control management server 211 displays the voucher content on the display screen (step S353).

Figure 4:
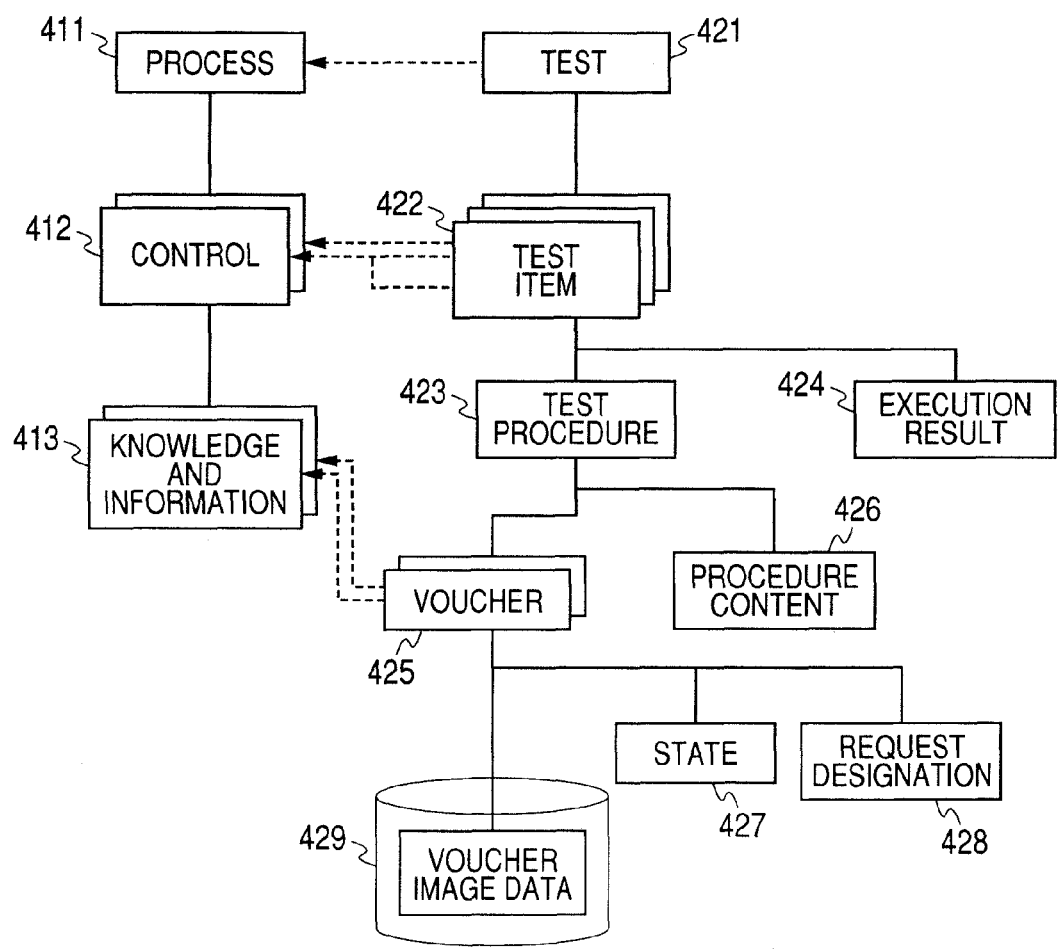
FIG. 4 is an explanatory view illustrating an exemplary data structure in the present embodiment.

Next, an example of the data structure in the present embodiment will be described with reference to FIG. 4. Blocks shown in FIG. 4 indicate data.

A basic controlled document for an internal control is a data group including a process 411, a control 412, and knowledge and information 413. The work process 411 includes the control 412, and the control 412 has the knowledge and information 413.

Data used in the assessment is a data group from a test 421 to voucher image data 429.

The test 421 may be associated with each process 411 in which a test is done. The test 421 has a test item 422.

The test item 422 may be associated with the control 412 in the internal control. A plurality of test items 422 may be associated with one control 412.

The test item 422 has a test procedure 423 and an execution result 424.

Moreover, the test procedure 423 has a voucher 425 and a procedure content 426.

The voucher 425 is associated with the knowledge and information 413 in the internal control.

The voucher 425 has a state 427, a request destination 428, and the voucher image data 429. The voucher image data 429 is stored in the voucher image registration module 131, and the voucher 425, the state 427, and the request destination 428 are stored in the voucher collection list storage module 102. The state 427 corresponds to the voucher request state 302 explained with reference to FIG. 3. The request destination 428 corresponds to a name or the like of the person in charge of voucher collection 202.

Next, an example of a screen display regarding definition of the assessment procedure will be described with reference to FIG. 5.

The internal control management server 211 that is the internal control system 100 displays a screen 500 for inputting details of a maintenance assessment plan.

The screen 500 for inputting details of a maintenance assessment plan three display regions, that is, a process list display region 510, a sub-process display region 520, and an assessment details input region 530.

Figure 5:
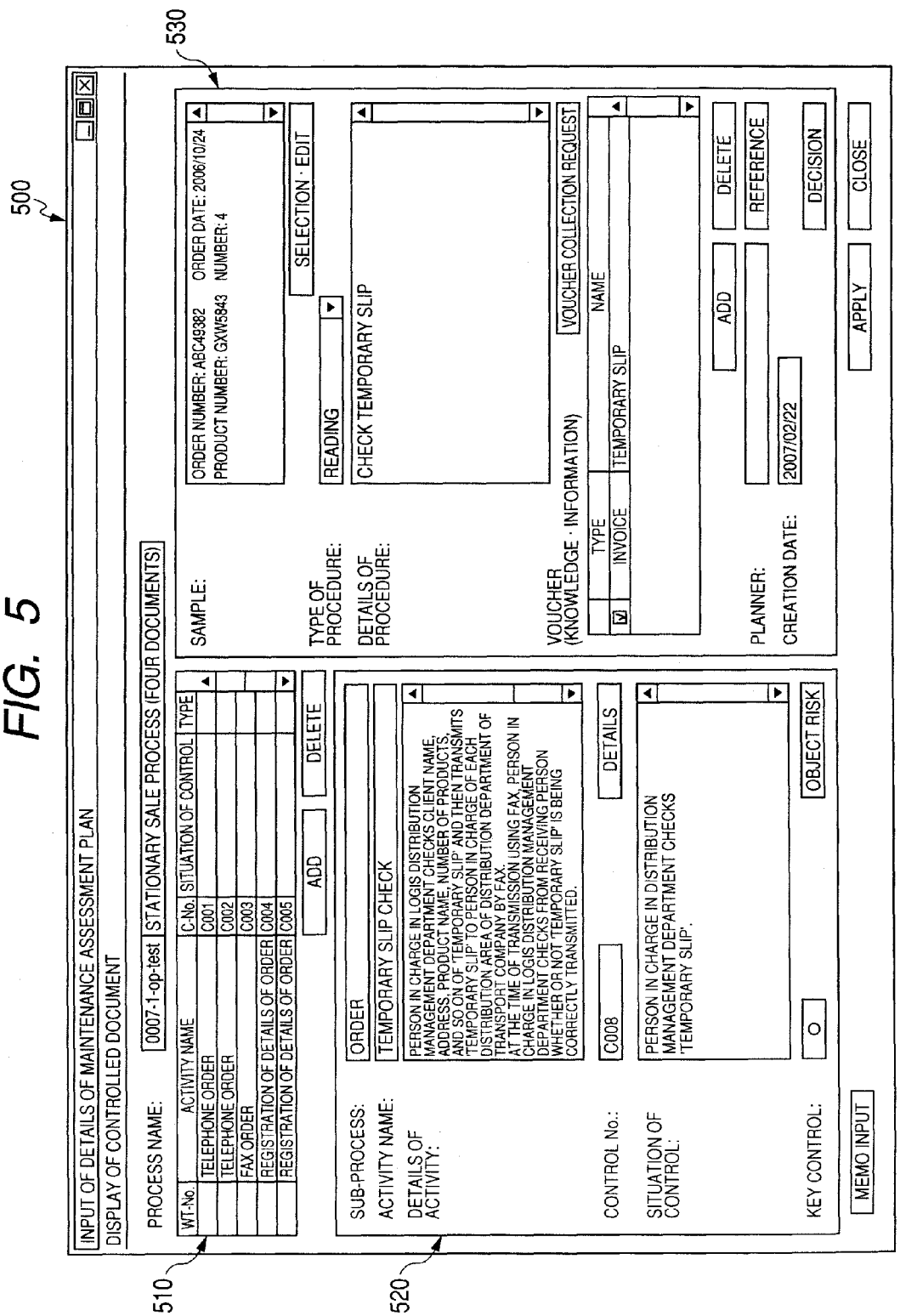
FIG. 5 is an explanatory view illustrating an example of a screen display regarding definition of an assessment procedure.

The screen 500 for inputting details of a maintenance assessment plan shown in FIG. 5 is a screen for inputting a plan of maintenance assessment for a 'stationery sale process (controlled document)' which is a work process.

In the process list display region 510, a table including an activity name and a situation of control is displayed.

In the sub-process display region 520, a sub-process of the work process, details of the activity, a situation of control, and the like are displayed.

In the assessment details input region 530, a sample (object of assessment out of actually performed activities), contents of a procedure, and a type of a voucher which are items required for the maintenance assessment, a planner, a creation date, and the like are displayed.

Figure 6:
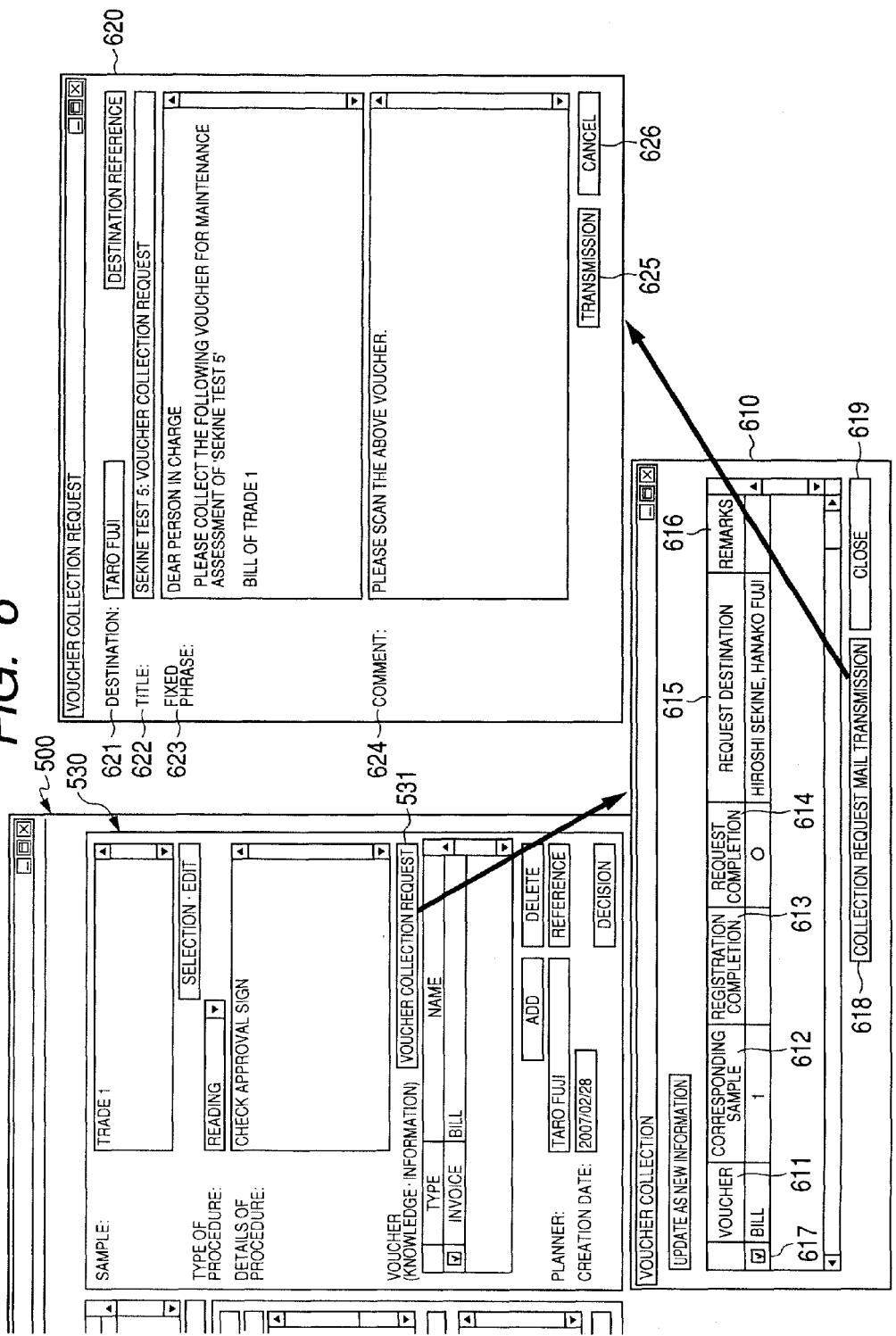
FIG. 6 is an explanatory view illustrating an example of a screen display regarding a voucher collection request.

An example of a screen display regarding the voucher collection request will be described with reference to FIG. 6.

Figure 2:
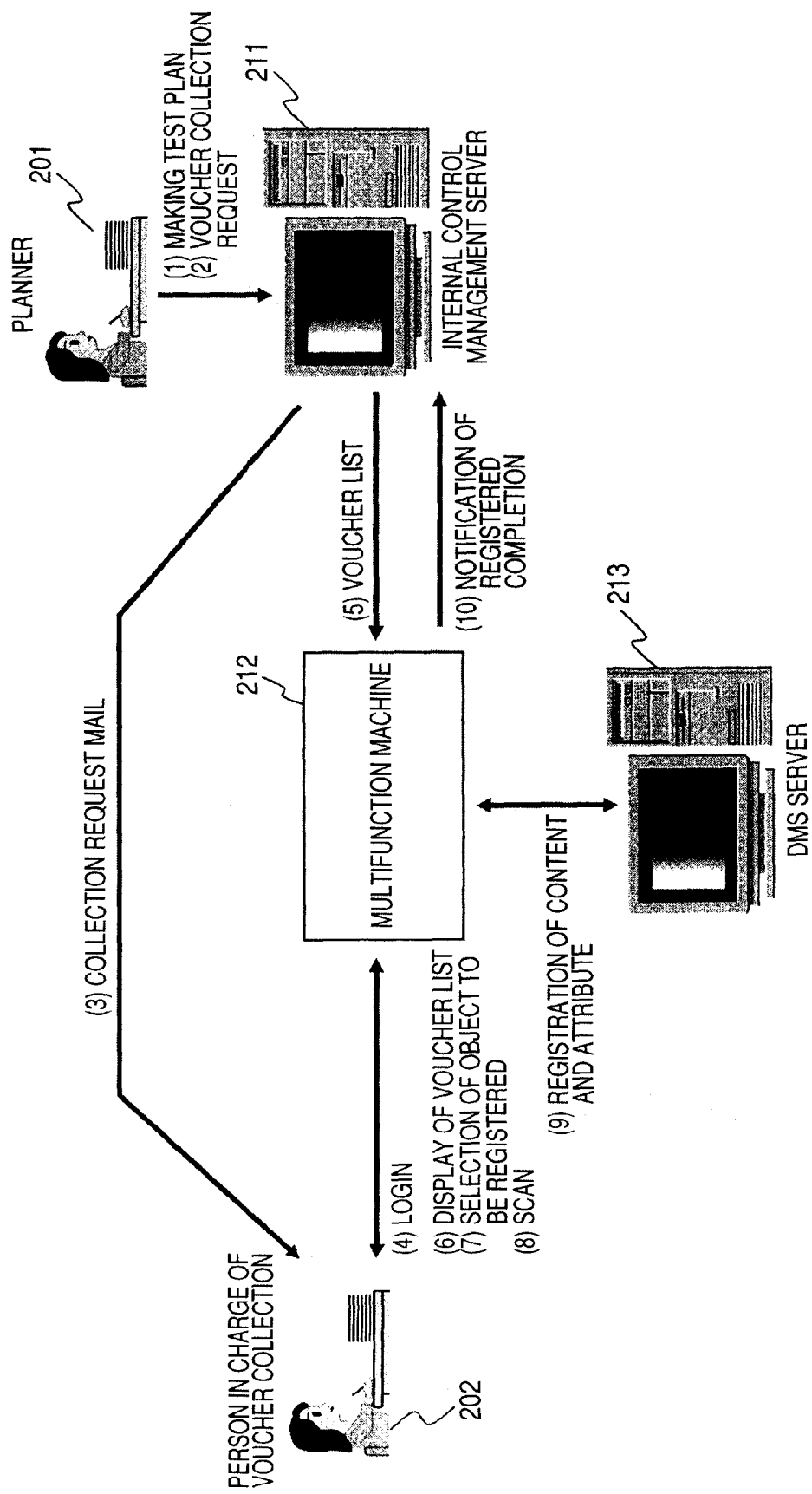
FIG. 2 is an explanatory view illustrating an exemplary configuration and processing of a system according to the present embodiment.
Figure 3:
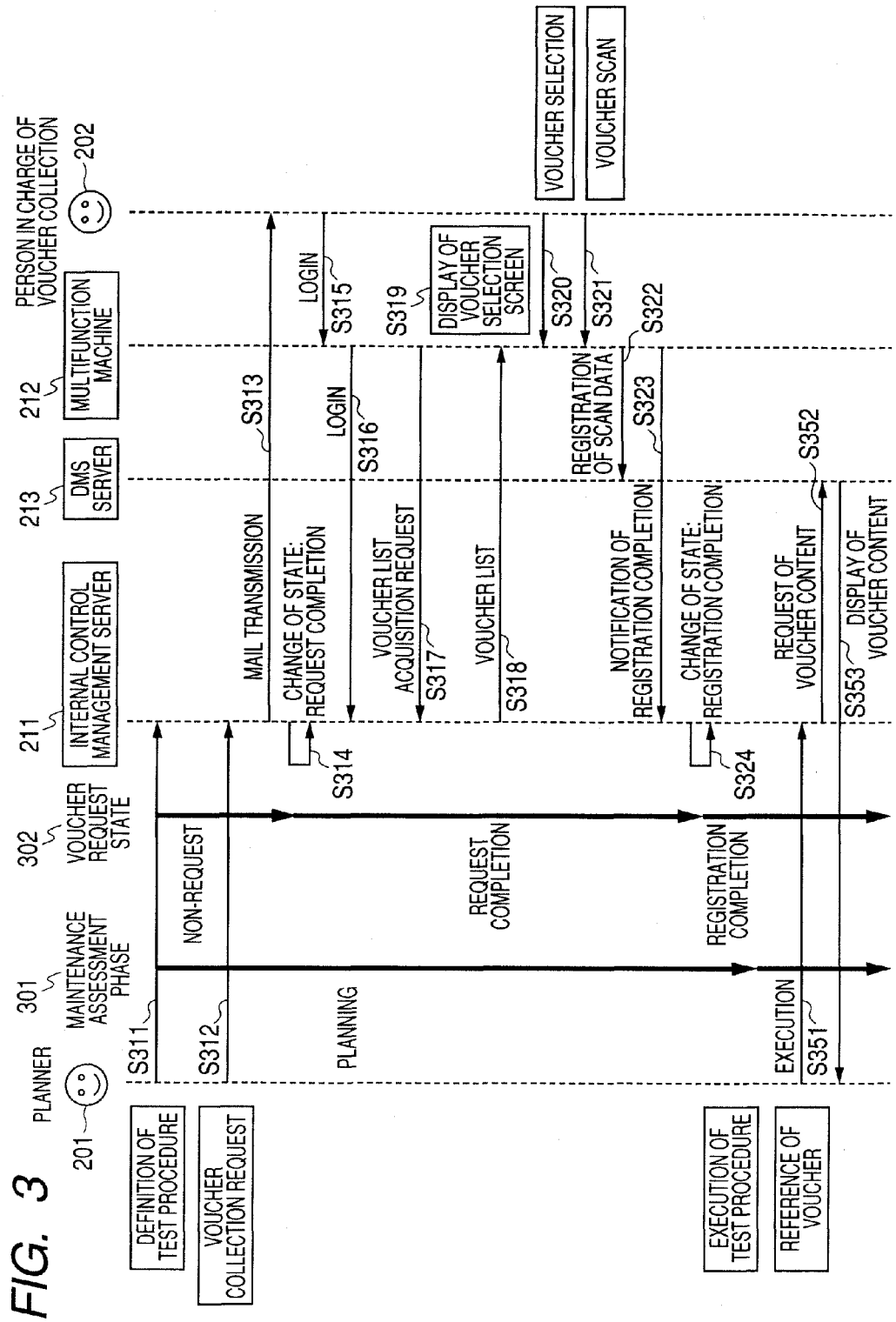
FIG. 3 is an explanatory view illustrating an exemplary processing in the present embodiment.

The internal control management server 211 displays a display region 610 regarding voucher collection and a display region 620 regarding a voucher collection request (refer to (1) of FIG. 2 and step S311 of FIG. 3).

If a voucher collection request button 531 on the screen 500 for inputting details of a maintenance assessment plan is pressed by the planner 201, the display region 610 regarding voucher collection is displayed.

The display region 610 regarding voucher collection has a voucher column 611, a corresponding sample column 612, a registration completion column 613, a request completion column 614, a request destination column 615, a remarks column 616, a check column 617, a collection request mail transmission button 618, and a close button 619.

The voucher column 611 to the remarks column 616 are displayed in the format of a table, and the planner 201 makes a selection using the check column 617. That is, in the table, a voucher, which is to be collected, written in the voucher column 611 corresponds to the person in charge of voucher collection 202, who collects the voucher, written in the request destination column 615.

In addition, if the collection request mail transmission button 618 is pressed by the planner 201, the display region 620 regarding a voucher collection request is displayed.

The display region 620 regarding a voucher collection request has a destination column 621, a title column 622, a fixed phrase column 623, a comment column 624, a transmission button 625, and a cancel button 626.

The display region 620 regarding a voucher collection request is a screen for writing details of a request mail. If the planner 201 presses the transmission button 625, the request mail is transmitted to the person in charge of voucher collection 202 written in the request destination column 615 (refer to (2) and (3) of FIG. 2 and steps S312 and S313 of FIG. 3).

Next, an example of a display of a login screen in the multifunction machine 212 will be described with reference to FIG. 7.

The multifunction machine 212 that is the image input system 120 displays a login screen 700.

The login screen 700 has a username column 701 and a password column 702.

When the collection request mail is received, the person in charge of voucher collection 202 who has collected vouchers inputs a username and a password in the username column 701 and the password column 702, respectively (refer to (4) of FIG. 2 and steps S315 and S316 of FIG. 3).

Next, an example of a display of a menu screen in the multifunction machine 212 will be described with reference to FIG. 8.

Then, the multifunction machine 212 displays a menu screen 800. The menu screen 800 has a voucher registration check column 801. The person in charge of voucher collection 202 selects the voucher registration check column 801.

Figure 9:
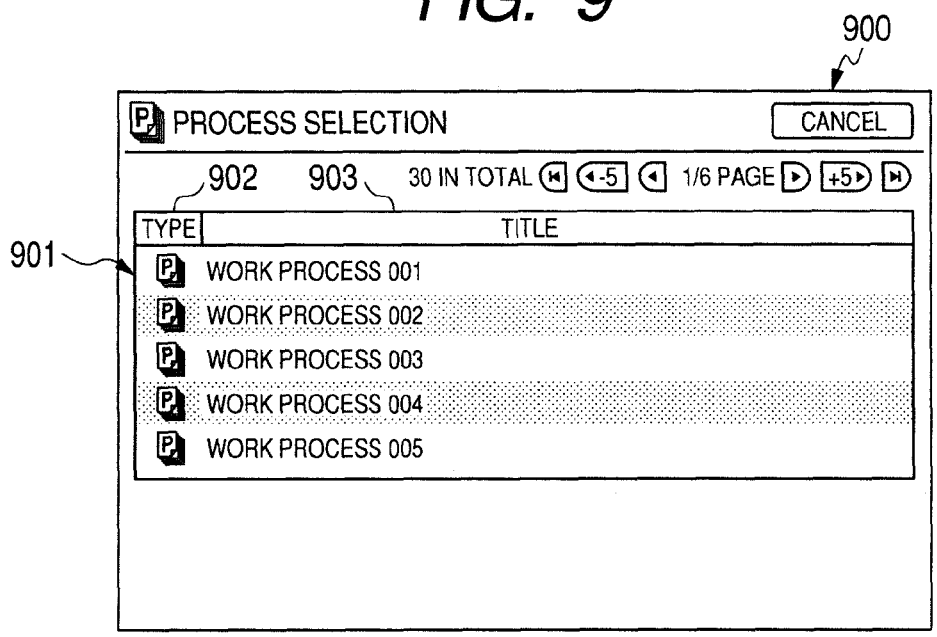
FIG. 9 is an explanatory view illustrating an example of a display of a process selection screen in the multifunction machine.

Next, an example of a display of a process selection screen in the multifunction machine 212 will be described with reference to FIG. 9.

Then, the multifunction machine 212 displays a process selection screen 900. The process selection screen 900 has a process selection list 901, and the process select list 901 has a type column 902 and a title column 903.

The multifunction machine 212 acquires a work process corresponding to the person in charge of voucher collection 202, who logs in the multifunction machine 212, from the internal control management server 211. The acquired work process group is displayed on the process selection list 901. The person in charge of voucher collection 202 selects a corresponding work process.

Figure 10:
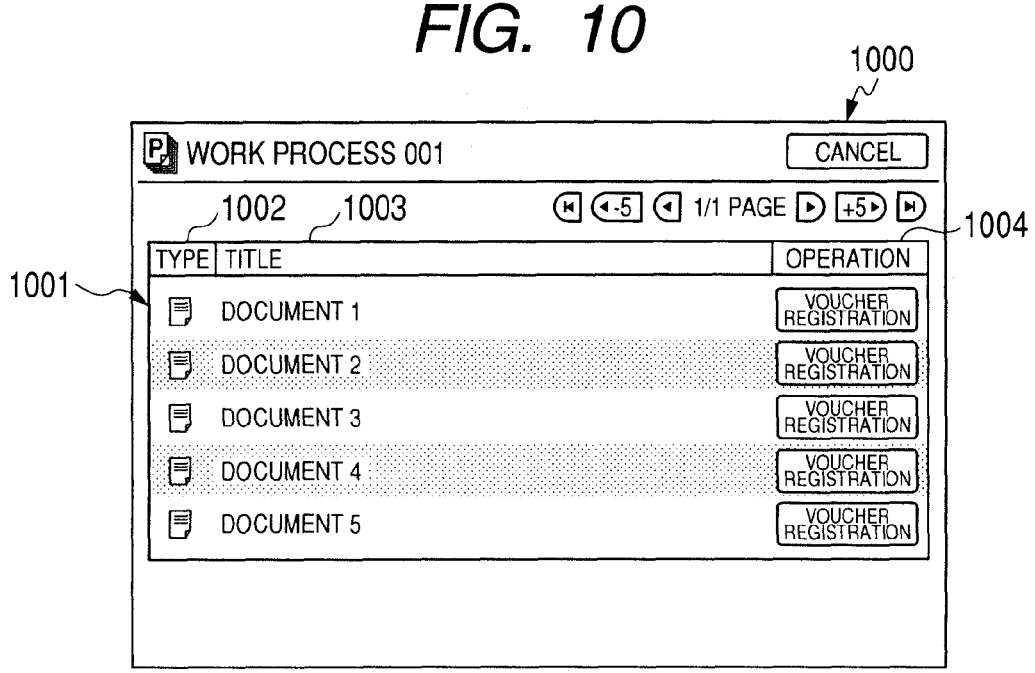
FIG. 10 is an explanatory view illustrating an example of a display of a work process screen in the multifunction machine.

Next, an example of a display of a work process screen in the multifunction machine 212 will be described with reference to FIG. 10.

Then, the multifunction machine 212 displays a work process screen 1000.

The work process screen 1000 has a document list 1001, and the document list 1001 has a type column 1002, a title column 1003, and an operation column 1004.

The multifunction machine 212 acquires from the internal control management server 211 a list of documents (vouchers), which is to be collected, corresponding to the work process (refer to (5) of FIG. 2 and steps S317 and S318 of FIG. 3. The list is displayed on the document list 1001 (refer to (6) of FIG. 2 and step S319 of FIG. 3). The person in charge of voucher collection 202 sets a voucher in the multifunction machine 212 and presses a 'voucher registration button' within the operation column 1004 (refer to (7) of FIG. 2 and step S320 of FIG. 3). Scanning is performed by the multifunction machine 212 (refer to (8) of FIG. 2 and step S321 of FIG. 3).

In addition, a control is made such that registered vouchers are not displayed on the document list 1001. That is, only an unregistered voucher is displayed.

Figure 11:
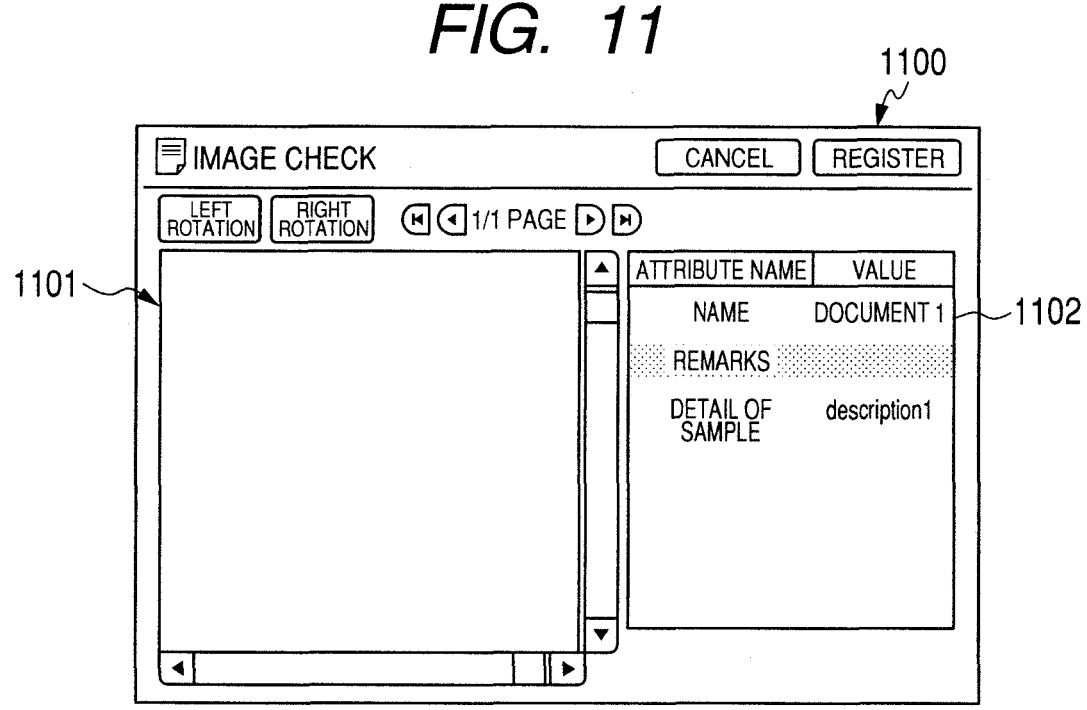
FIG. 11 is an explanatory view illustrating an example of a display of an image check screen in the multifunction machine.

Next, an example of a display of an image check screen in the multifunction machine 212 will be described with reference to FIG. 11.

Then, the multifunction machine 212 displays an image check screen 1100.

The image confirmation screen 1100 has two display regions, that is, an image display region 1101 and an attribute value display region 1102. A scan image is displayed in the image display region 1101, and attributes (names of vouchers, remarks, and the like) at this time are displayed in the attribute value display region 1102. The person in charge of voucher collection 202 checks the screens and presses a 'registration' button in the case of registration.

Figure 12:
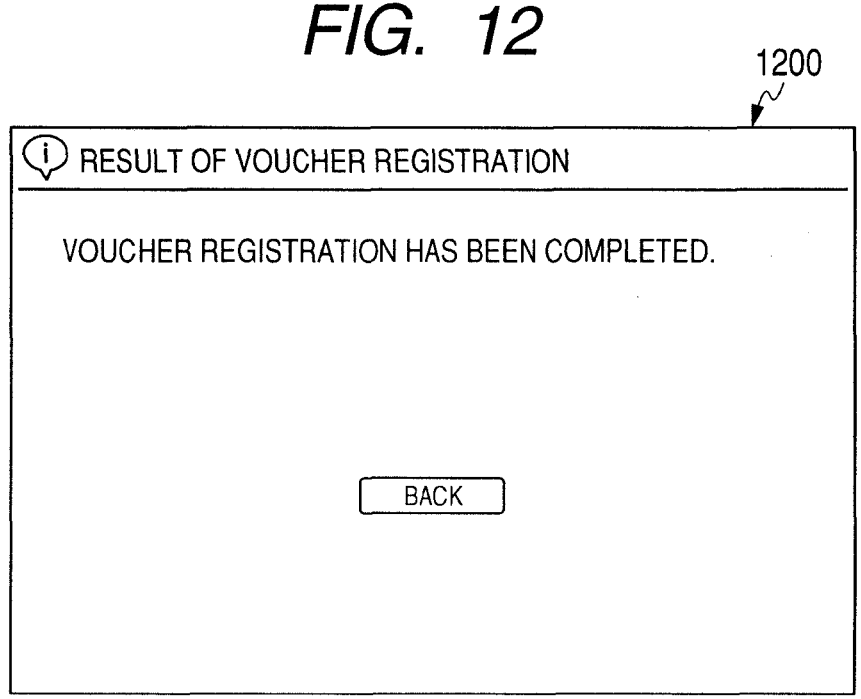
FIG. 12 is an explanatory view illustrating an example of a display of a voucher registration check screen in the multifunction machine.

Next, an example of a display of a voucher registration check screen in the multifunction machine 212 will be described with reference to FIG. 12.

Then, the multifunction machine 212 displays a completion screen 1200.

The multifunction machine 212 registers scanned image data in the DMS server 213 (refer to (9) of FIG. 2 and step S322 of FIG. 3). Thereafter, the multifunction machine 212 notifies the internal control management server 211 that registration has been completed (refer to (10) of FIG. 2 and step S323 of FIG. 3).

Figure 13:
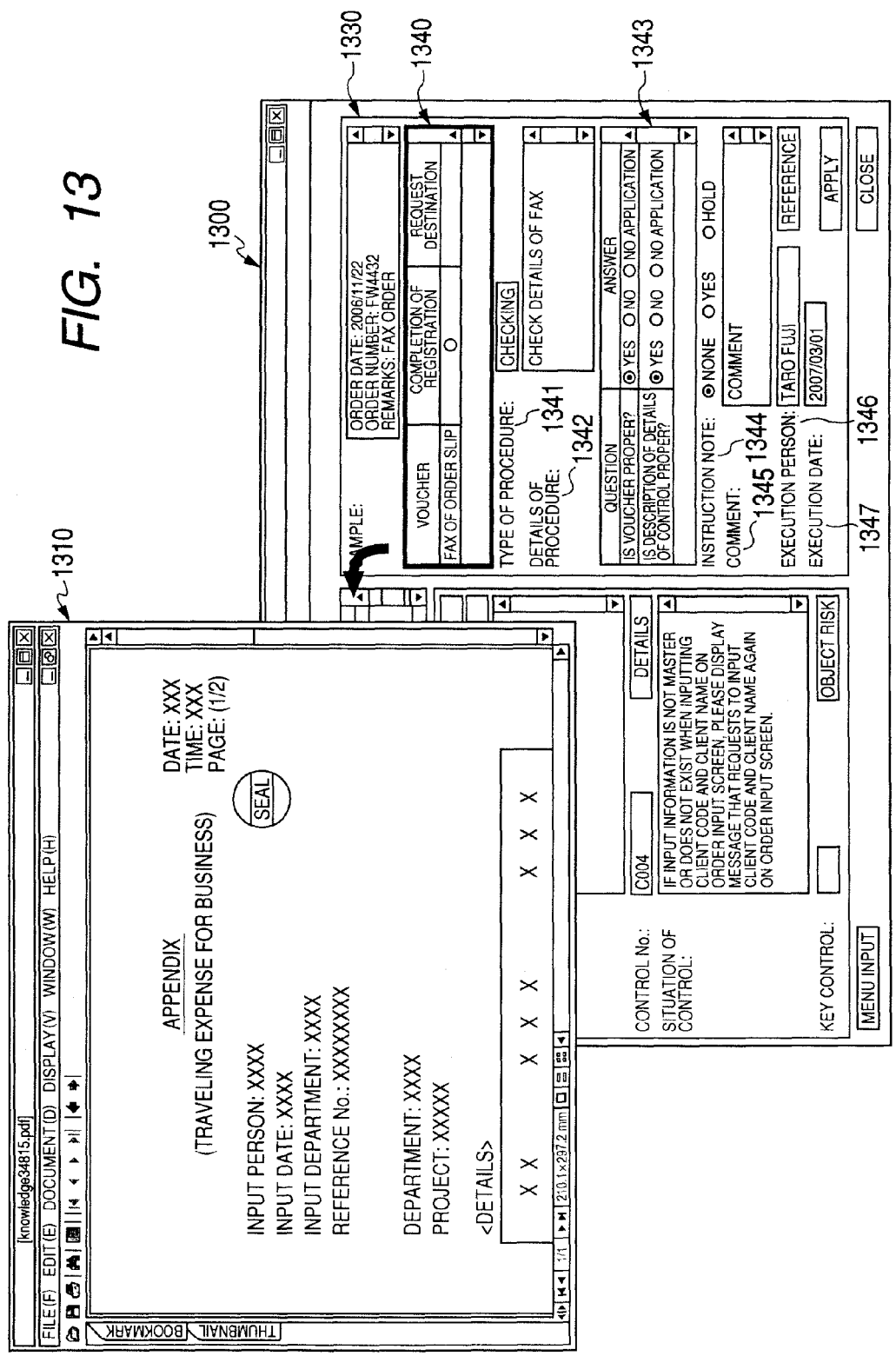
FIG. 13 is an explanatory view illustrating an example of a screen display of a voucher.

Next, an example of a screen display of a voucher will be described with reference to FIG. 13. That is, a screen where assessment is performed by the test module 108 is shown in FIG. 13 (refer to steps S351 to S353 of FIG. 3).

The internal control management server 211 displays a maintenance assessment screen 1300 and a voucher display region 1310.

The maintenance assessment screen 1300 has an assessment contents input region 1330. The assessment contents input region 1330 has a voucher list display region 1340, a procedure type column 1341, a procedure contents column 1342, an assessment region 1343, an instruction note column 1344, a comment column 1345, an execution person column 1346, and an execution date column 1347.

When a user selects a voucher in the voucher list display region 1340 (refer to step S352 of FIG. 3), the corresponding voucher (image data of a voucher registered in the DMS server 213) is displayed in the voucher display region 1310 (refer to step S353 of FIG. 3).

Figure 14:
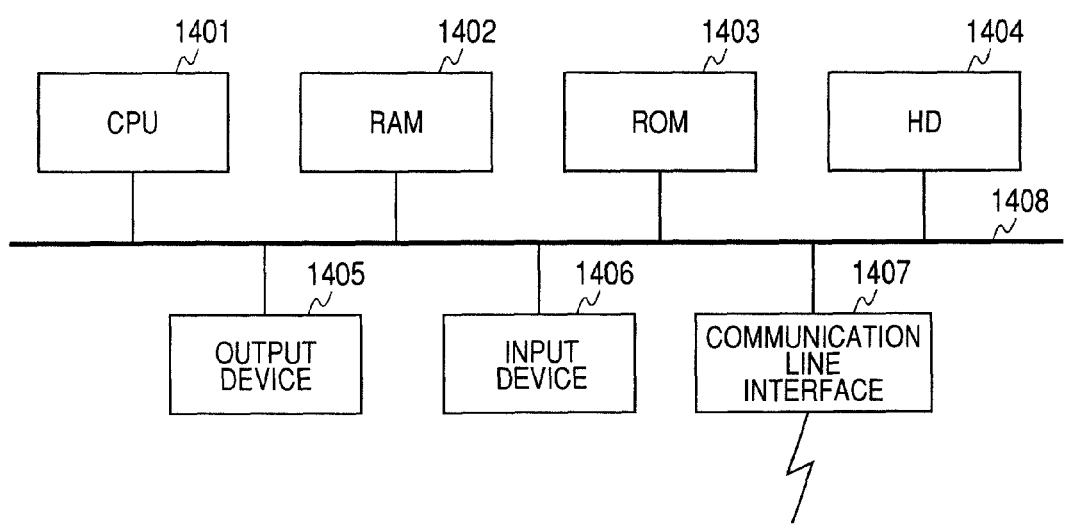
FIG. 14 is a block diagram illustrating an exemplary hardware configuration of a computer for realizing the present embodiment.

In addition, the hardware configuration of the DMS server 213, the PC 221, and the internal control management server 211 where a program according to the present embodiment is executed is the same as that of a typical computer, as shown in FIG. 14. Specifically, the hardware configuration of the DMS server 213, the PC 221, and the internal control management server 211 where a program according to the present embodiment is executed is a computer or a personal computer serving as a server. The computer is configured to include: a CPU 1401 that executes programs, such as the voucher collection list creation module 101, the mail transmission module 103, and the login management module 104; a RAM 1402 that stores the programs or data; a ROM 1403 in which, for example, a program for starting the computer is stored; an HD 1404 (for example, a hard disk may be used) that is an auxiliary storage device; an input device 1406, such as a keyboard or a mouse, used to input data; an output device 1405, such as a CRT or a liquid crystal display; a communication line interface 1407 (for example, a network interface card may be used) used for communication with a communication network; and a bus 1408 for data exchange. The plurality of computers may be connected to each other through a network.

In addition, the hardware configuration shown in FIG. 14 is an example of the configuration. A configuration that allows the modules explained in the present embodiment to be executable may be adopted in the present embodiment without being limited to the configuration shown in FIG. 14. For example, some of the modules may be configured using dedicated hardware (for example, ASIC), or some of the modules may be provided in an external system and are connected to each other through a communication line. In addition, a plurality of systems shown in FIG. 14 may be connected to each other through a communication line so as to operate cooperatively.

In addition, the multifunction machine 212 has the hardware configuration shown in FIG. 14 and includes a scanner as the input device 1406 and a printer as the output device 1405.

Furthermore, even though the voucher image input non-request state, the voucher image input request completion state, and the voucher image registration completion state have been stored in the voucher collection list storage module 102, these states may be displayed on the maintenance assessment screen 1300 such that a user can make a schedule management on how far the voucher collection has been made.

Furthermore, it may be possible to set a deadline of voucher collection, store the deadline in the voucher collection list storage module 102 for every voucher, and compare the deadline with current date and time such that a voucher that is not registered yet is displayed even if the deadline expires.

In addition, the person in charge of voucher collection 202 who receives a voucher collection request may cause another person in charge to execute the voucher collection in substitution for the person in charge of voucher collection 202. For example, a 'substitute designation' may be displayed on the menu screen 800 shown in FIG. 8 such that a substitute can be selected. That is, a voucher that needs to be collected through a substitute to be designated may be selected from a voucher list that has been requested, and then a substitute may be designated. If a 'substitution request' button is pressed, a request mail may be transmitted to the substitute who is designated. A selected voucher is written in the request mail.

The multifunction machine 212 notifies the internal control management server 211 that the person in charge has been changed, and the internal control management server 211 changes a voucher to be collected and a person in charge within a corresponding list of the person in charge of the collection.

Furthermore, the program described above may be provided in a state in which the program is stored in a recording medium or the program may be provided through a communication unit. In this case, the program described above may be regarded as the invention of a 'computer-readable recording medium in which a program is recorded', for example.

The 'computer-readable recording medium in which a program is recorded' refers to a recording medium that can be read by a computer recorded with a program, which is used for installation, execution, distribution, and the like of the program.

For example, recording mediums include: in association with a digital versatile disk (DVD), 'DVD-R, DVD-RW, DVD-RAM, and the like' that are standards established by a DVD forum and 'DVD+R, DVD+RW, and the like' that are standards established by a DVD+RW forum; in association with a compact disk (CD), a read only memory (CD-ROM), a CD recordable (CD-R), and a CD rewritable (CD-RW), and the like; a magneto-optic disk (MO); a flexible disk (FD); a magnetic tape; a hard disk; a read only memory (ROM); an electrically erasable and programmable read only memory (EEPROM); a flash memory; and a random access memory (RAM).

In addition, the program or a part of the program may be stored or distributed in a state in which the program or a part of the program is recorded in the recording medium. Furthermore, the program may be transmitted through communication, for example, a wireline network such as a local area network (LAN), a metropolitan area network (MAN), a wide area network (WAN), Internet, an intranet, and an extranet or a wireless communication network. Alternatively, the program may be transmitted through a transmission medium obtained by combination of those described above or may be carried on a carrier.

Moreover, the program described above may be a part of another program or may be recorded on a recording medium together with a separate program. In addition, the program described above may be separated to be recorded in a plurality of recording mediums. In addition, the program described above may be recorded in any kind of format including compression, encryption, and the like as long as the program can be restored.

What is claimed is:

1. An information processing system comprising:
    an information processing apparatus; and
    an image input apparatus comprising a component of a multifunction device, the information processing apparatus comprising:
    a first memory that stores a correspondence relationship between a name of a document for which image input is to be performed and a name of a user who is to perform the image input of the document;
    a second memory that stores a state of the document;
    a first transmission unit that transmits to the user a request to input the image of the document;
    a second transmission unit that determines the name of the document from the correspondence relationship stored in the first memory on the basis of the name of the user, the name of the user being received from the image input apparatus, and that transmits the name of the document to the image input apparatus; and a display that displays a maintenance assessment screen that illustrates the state of the document to a planner, thereby allowing the planner to schedule management based on progress of registration of the document, and the maintenance assessment screen illustrating the state of the document as one of a non-request state that indicates the request of the first transmission unit is transmitted to the user, a request completion state that indicates the request of the first transmission unit is received by the user, and a registration completion state that indicates registration of an image of the document is completed, the component of the multifunction device comprising:

an authentication unit that authenticates the user;

a third transmission unit that transmits the name of the authenticated user to the information processing apparatus;

a receiving unit that receives from the information processing apparatus the name of a document associated with the name of the authenticated user;

a display that displays a message requesting the user to perform the image input of the document based on the received name of the document;

an image input unit that receives the document from the user and generates an image of the document;

a registration unit that registers the image of the document; and a fourth transmission unit that transmits to the information processing system a notice indicating that the registration of the image of the document is completed and the name of the document together with an identifier of the registered image of the document, wherein when the information processing system receives the notice from the fourth transmission unit of the image input apparatus, the information processing system changes the state of the document into a state showing a registration completion state which indicates the registration of the image of the document is completed.

2. The information processing system according to claim 1, wherein when the first transmission unit transmits the request to input the image of the document to the user, the second memory stores a state that indicates the request to input the image of the document is completed.

3. The information processing system according to claim 1, wherein the document comprises a basic controlled document that describes a work process to be subjected to financial internal control and the basic controlled document comprises at least one of a work description narrative of the work process, a work flow of the work process, a risk control matrix of the work process, and a job division table of the work process.

4. An information processing method for an information processing system that comprises an information processing apparatus and an image input apparatus comprising a component of a multifunction device, the method comprising:

storing in a first memory a correspondence relationship between a name of a document for which image input is to be performed and a name of a user who is to perform the image input of the document;

storing in a second memory a state of the document;

transmitting to the user a request to input the image of the document;

determining the name of the document from the correspondence relationship stored in the first memory on the basis of the name of the user, the name of the user being received from the image input apparatus, and transmitting the name of the document to the image input apparatus;

authenticating the user;

transmitting the name of the authenticated user to the information processing apparatus;

receiving from the information processing apparatus the name of a document associated with the name of the authenticated user;

displaying a message requesting the user to perform the image input of the document based on the received name of the document;

receiving the document from the user and generating an image of the document;

registering the image of the document; and transmitting to the information processing system a notice indicating that the registration of the image of the document is completed and the name of the document together with an identifier of the registered image of the document, wherein, when the information processing system receives the notice from the image input apparatus, the information processing system changes the state of the document into a state showing a registration completion state which indicates the registration of the image of the document is completed, and wherein the information processing apparatus displays a maintenance assessment screen that illustrates the state of the document to a planner, thereby allowing the planner to schedule management based on progress of registration of the document, and the maintenance assessment screen illustrating the state of the document as one of a non-request state that indicates the request of the first transmission unit is transmitted to the user, a request completion state that indicates the request of the first transmission unit is received by the user, and a registration completion state that indicates registration of an image of the document is completed.

* * * * *